Dec. 1, 1959 M. N. FAIRBANK 2,915,393

PHOTOGRAPHIC APPARATUS AND PROCESS

Filed Nov. 24, 1953 2 Sheets-Sheet 1

INVENTOR

Murry N. Fairbank

BY Brown and Mikulka

ATTORNEYS

PHOTOGRAPHIC APPARATUS AND PROCESS

Filed Nov. 24, 1953 2 Sheets-Sheet 2

INVENTOR
Murry N. Fairbank

BY Brown and Mikulka
ATTORNEYS 2,915,393
Patented Dec. 1, 1959

2,915,393

PHOTOGRAPHIC APPARATUS AND PROCESS

Murry N. Fairbank, Belmont, Mass., assignor to Polaroid Corporation, Cambridge, Mass., a corporation of Delaware Application November 24, 1953, Serial No. 394,158

24 Claims. (Cl. 96—50)

This invention relates to photography and more particularly to processes and apparatus for predeterminedly treating photosensitive sheet material by providing on the surface thereof a layer of a suitable processing liquid.

It is a principal object of the present invention to provide a novel process and apparatus for predeterminedly processing a frame of an exposed photosensitive strip by providing on the surface of said frame a quantity of liquid capable of effecting said processing and spreading said liquid in a thin layer coextensive with said frame.

Another object of the present invention is to provide a novel process and apparatus for processing successive frames of an exposed photosensitive strip by superposing said frames on areas of a second strip, providing a quantity of processing liquid between the associated surfaces of said frames and said areas, and spreading said processing liquid in a thin layer between said strips at least coextensive with said frames.

A further object of the present invention is to provide photographic processing apparatus comprising means having a pair of substantially flat pressure-applying surfaces adapted to receive therebetween a photosensitive strip and a second strip in superposed relation, means for providing a quantity of processing liquid between said strips, and means for creating pressure between said surfaces for spreading said processing liquid in a thin layer between said strips.

Still further objects of the present invention are to provide, in apparatus of the above type: a pair of platens adapted to receive therebetween a photosensitive strip and a second strip in superposed relation; a pair of platens having pressure-applying surfaces and reciprocating means for intermittently moving one of said platens toward the other of said platens in order to exert pressure therebetween; means for intermittently advancing successive frames of a photosensitive strip into position between the pressure-applying surfaces of said platens; means for intermittently advancing successive areas of a second strip into superposition with said frames of said photosensitive strip positioned between said platens; means for providing a quantity of processing liquid between said superposed frames and areas of said strips; means for creating a predetermined pressure between the surfaces of said platens for spreading said processing liquid between said strips in a thin layer at least coextensive with a frame and of a predetermined thickness; means for spacing said surfaces of said platens a predetermined distance apart whereby said processing liquid is spread in a layer of predetermined thickness; means associated with said platens for confining said liquid between said pressure-applying surfaces and for spacing said surfaces a predetermined distance apart; control means rendering said strip-advancing means inoperative when said reciprocating means is operative to move said platens toward one another; control means rendering said reciprocating means effective to retain said platens in pressure-applying position during a predetermined processing time and, at the end of said processing time, to move one of said platens away from the other of said platens.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
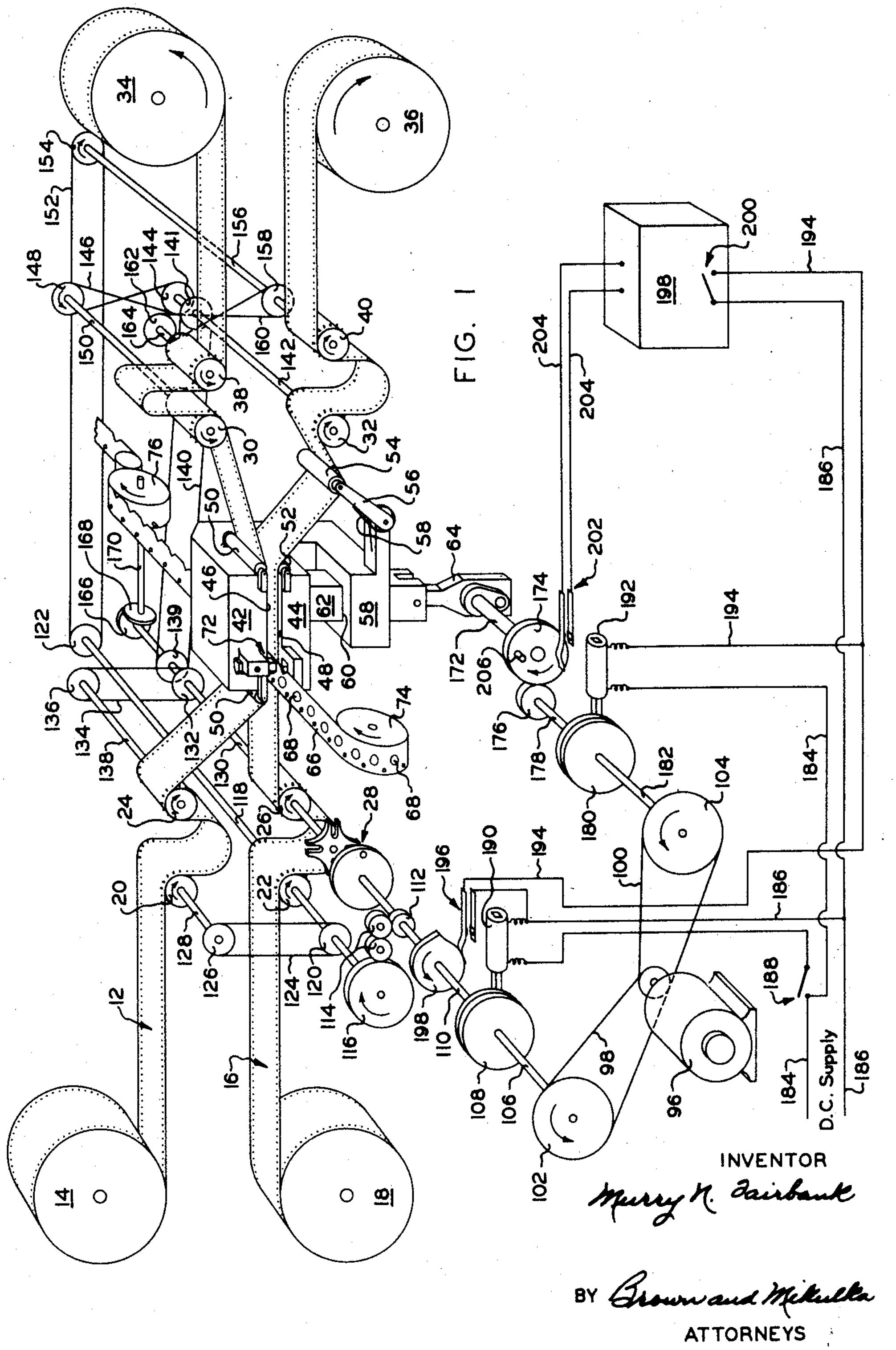
Figure 1 is a diagrammatic perspective view of processing apparatus embodying the present invention.

Generally, the herein disclosed invention includes a process and apparatus for predeterminedly treating a strip of photo-sensitive material and, in the form shown, comprises means for superposing an exposed frame of a photosensitive strip with an area of a second strip, means for providing a quantity of processing liquid between the frame and area, and means for subjecting the frame and area to compressive pressure to effect the spreading of the processing liquid in a thin layer between the frame and area at least coextensive with the frame. The processing apparatus may be associated with means for photographically exposing successive frames of a photosensitive strip for example, with a photo copy camera, and is particularly suited for processing frames of the smaller sizes such as 35 mm. and the like.

The processing apparatus includes a pair of platens having substantially flat pressure-applying surfaces between which the superposed frame and area are positioned. Means are provided for intermittently advancing successive frames of the photosensitive strip and areas of a second strip into superposed relation between the pressure-applying surfaces of the two platens. The processing liquid is provided in a series of rupturable containers or pods, each pod holding a predetermined quantity of processing liquid capable of effecting the processing of a frame. A container or pod may be secured to either of said strips adjacent a frame or area thereof and preferably are provided in strip form so that a single pod may be advanced into position between a frame and an area positioned between the two platens. The processing apparatus includes means for moving one platen toward and away from the other platen. Means associated with the platens are adapted to apply compressive pressure to a pod to effect its rupture, as the platens are moved toward one another, to provide a quantity of processing liquid between a frame and an area. The processing liquid may be discharged between a frame and an area and form in a pool on one of said strips generally in the center of a frame to be processed. The platens continue to move toward one another to exert a predetermined compressive pressure on the frame and area positioned therebetween and thereby effect the spreading of the processing liquid in a layer of predetermined thickness between the associated surfaces of the two strips. To assure a uniform spreading of a layer of liquid coextensive with a frame, the liquid may be provided in a quantity in excess of that required for a layer of the desired thickness. There may be provided means such as shoulders along the edges of one of the platens for retaining the liquid between the two platens and also means for trapping excess liquid spread between the strips. To assure a layer of liquid of the desired predetermined thickness, the platens may be provided with resilient means for controlling the pressure exerted between the platens and/or means, such as the shoulders heretofore mentioned, for spacing the pressure-applying surfaces of the platens a predetermined distance apart. The apparatus includes electrical and mechanical means for controlling the intermittent advancement of the photosensitive and second strips in relation to the reciprocation of one of the platens and for holding the platens in pressure-applying position during a predetermined processing time. At the end of the predetermined processing time, the platens are moved away from one another and the frame and area positioned therebtewen are advanced and separated from one another.

The herein disclosed apparatus is particularly adapted to the processing, now well known in the art, of a photosensitive strip to produce transfer prints on areas of a second strip which correspond to the latent images in the frames of the photosensitive strip. By way of example, the photosensitive strip may include a silver halide layer, the second strip a silver precipitating layer and the processing liquid a developer, a silver halide solvent and an alkali. In the presence of the layer of processing liquid between the frame and area, a latent image in the photosensitive strip is developed to silver and a soluble silver complex from undeveloped silver is formed and transferred by imbibition to the second strip and there developed to produce a positive image.

The photographic process and various species and alternative forms of photosensitive and second strips herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of photosensitive and second strips, the terms "photosensitive strip" and "second strip" being used in their broadest sense to indicate a first strip which is photosensitive and a second strip which may merely aid in spreading the processing liquid over the surface of a photosensitive strip and isolating the layer of liquid from the spreading means, and which may, if desired, possess other characteristics such, for example, as being a transparent material suitable for the formation thereon of an image capable of being projected.

Referring now to the drawings, wherein like numerals denote like parts, there is shown somewhat diagrammatically in Fig. 1, photographic processing apparatus embodying the present invention. A strip of photosensitive material 12 is illustrated as extending from some convenient supply such as a roll or spool 14, it being understood that the processing apparatus may also be associated with means such as a camera wherein the photosensitive strip is exposed. A second strip 16 is shown as extending from a roll or a spool 18 on which it is coiled and from which it is supplied. A suitable light-tight housing (not shown) may be provided for the apparatus in order to prevent exposure of the photosensitive strip during processing. The photosensitive and second strips may be provided with means such as marginal perforations adapted to be engaged by sprockets of the conventional type for advancing the strips through the processing apparatus. To advance photosensitive strip 12 and second strip 16 from their respective supplies, there are provided a pair of sprockets 20 and 22 adapted respectively to engage the photosensitive and second strips. Sprockets 20 and 22 are adapted to rotate at the same speed (clockwise as viewed in Fig. 1) to withdraw the photosensitive and second strips from their respective supplies at a substantially slow and uniform speed to avoid the application of sudden stresses to the strips.

Means are provided for intermittently advancing successive frames of photosensitive strip 12 into superposition with areas of second strip 16, the latter being advanced intermittently at substantially the same speed as photosensitive strip 12. In the form shown, this means comprises a pair of sprockets 24 and 26 positioned, respectively, adjacent sprockets 20 and 22 and adapted to engage and advance, respectively, photosensitive strip 12 and second strip 16. A conventional Geneva movement 28 is provided to intermittently rotate sprockets 24 and 26 in a clockwise direction, thereby advancing strips 12 and 16 one frame at a time. A second pair of sprockets 30 and 32 are provided for advancing photosensitive strip 12 and second strip 16, respectively, through the apparatus. Sprockets 30 and 32 are connected through suitable drive means, to be more fully described, to Geneva movement 28 so that they rotate, respectively, in counterclockwise and clockwise directions at the same time and speed as sprockets 24 and 26. The strips are advanced onto suitable take-up means indicated at 34 and 36 by a pair of sprockets 38 and 40 positioned, respectively, adjacent sprockets 30 and 32 and rotated by suitable drive means at the same speed as sprockets 20 and 22. It is to be noted that sprockets 24 and 26 are so positioned with respect to sprockets 20 and 22, and sprockets 38 and 40 are so positioned wtih respect to sprockets 30 and 32 that the photosensitive and second strips extend between a constantly rotating sprocket and an intermittently rotating sprocket in a loop which serves to prevent the application of stresses to the strips as their movement is suddenly accelerated. It is to be understood that suitable pad rolls (not shown) may be provided in conjunction with the sprockets for holding the strips in engagement therewith.

In accordance with the present invention, a pair of platens 42 and 44 are provided between which a superposed frame and area, respectively, of the photosensitive and second strips may be positioned. In the form shown, platens 42 and 44 are rectangular and have pressure-applying surfaces 46 and 48 which are substantially flat and parallel with one another when the platens are operatively juxtaposed. Platen 42 is held in a fixed position by suitable support means while platen 44 is movable toward and away from platen 42. While the platens have been illustrated (in Fig. 1) with their pressure-applying surfaces in horizontal position and with the fixed platen uppermost, it is to be understood that the platens may be in any position and either or both platens may be movable.

To guide the photosensitive and second strips into position between the platens, fixed platen 42 is provided with idler guide rolls 50 mounted thereon adjacent the ends of pressure-applying surface 46, while a pair of guide rolls 52 are mounted on movable platen 44 adjacent the ends of pressure-applying surface 48. By virtue of this arrangement, photosensitive strip 12 and second strip 16 extend, respectively, from sprockets 24 and 26 into contact with one of rolls 50 and 52, across surfaces 46 and 48, into contact with the other of rolls 50 and 52, and into engagement with sprockets 30 and 32. In order to maintain tension on second strip 16 as it is advanced between sprockets 26 and 32 and regardless of the position of movable platen 44, there is provided a tension roll 54 mounted on a pivotal arm 56 secured to fixed arm 54. Means such as a spring 58 are provided for holding roll 54 in contact with second strip 16 as it advances between idler roll 52 and sprocket 32.

As a means for movably mounting and reciprocating platen 44, there is provided in the form shown a fixed support member 58 having a hole or slot 66 adapted to slidably receive a rod 62, the axis of which is normal to pressure-applying surface 46 of platen 42. Platen 44 is secured to one end of rod 62 while the other end of said rod is pivotally connected with a conventional crank 64 capable of reciprocating platen 42 toward and away from platen 44.

The processing apparatus includes means for providing a quantity of processing liquid between a frame of photosensitive strip 12 and an area of second strip 16 superposed therewith, this means being adapted to cause the discharge of processing liquid from a collapsible container or pod in which it is carried. Fluid containers of the type suitable for use in the present invention are described in Patent No. 2,634,886, issued April 14, 1953, to Edwin H. Land for Collapsible Fluid Container, and Patent No. 2,653,732, issued September 29, 1953, to Edwin H. Land for Single Use Container Having a Sealed Passage Adapted To Be Unsealed Upon Application of Stress. The present invention comprehends the use of a series of containers joined together in strip form and generally indicated at 66. Each successive container, indicated at 68, may be advanced into position between photosensitive strip 12 and second strip 16 adjacent the end of a frame and there be subjected to the application of compressive stress to discharge its liquid contents between the frame and area of the second strip superposed therewith. The containers disclosed in the aforementioned patents may comprise an elongated rectangular strip of suitable sheet material folded medially and sealed at its marginal edges and transversely to form pods, the longitudinal edge portions being bonded together less securely than transverse portions. This structure cooperates in assuring a unidirectional release of the liquid contents of the container when the latter is subjected to a compressive squeezing force. To further assure the uniform and complete opening of the longitudinal seal and thereby insure a direct spread of the liquid from the container over an area as wide as the liquid-carrying cavity of the container, the liquid contents of the container preferably have a predetermined minimum viscosity as described in said patents. In the present invention, it may not be necessary to effect the uniform and complete opening of a relatively long sealed container, and the liquid contents thereof need not be viscous. In addition, it has been found that a nonviscous liquid is best adapted for spreading by the application of pressure as comprehended in the present invention.

In the present invention, it may be desirable to provide a quantity of processing liquid between a frame and an area in a pool on one of the strips substantially in the center of the frame so that the application of pressure on the strips will result in a spreading of the liquid in all directions in a layer at least coextensive with the frame. To effect the supply of a quantity of processing in such a pool, it is desirable to insure the rupture of the container and the discharge of its liquid contents at a predetermined point along its longitudinal seal. The containers 68 may be formed as illustrated in a continuous strip, the liquid-carrying cavities being generally round rather than rectangular and elongated. To assure the release or discharge of the liquid from a container toward the center of a frame, means are provided for weakening the container seal so that application of compressive pressure to the container results in rupture of the seal and discharge of the liquid at a predetermined point. A container 68 may be weakened at any desired point by notching the longitudinal edges 70 to which it is sealed, the notch 71 preferably extending almost into the liquid-carrying cavity. As a means for notching the edges of a container, there is provided a V-shaped punch 72 associated with platens 42 and 44 and so positioned that as the platens are moved together, punch 72 cuts a V-shaped notch 71 in the edge 70 of a container 68.

A strip 66 of containers 68 is advanced from a supply such as a roll 74 and extends between strips 12 and 16 in position between platens 42 and 44. To advance strip 66, there is provided a sprocket 76 adapted to engage perforations 77 formed for this purpose in strip 66 between successive containers along one edge thereof. A sprocket 76 is operatively connected through suitable drive means to Geneva movement 28 so that a container is advanced into position between a frame and an area each time a frame and an area of the strips are advanced into superposition between platens 42 and 44. As a container is moved into position between a frame and an area, the next successive container moves into position to be notched by punch 72.

Figure 2:
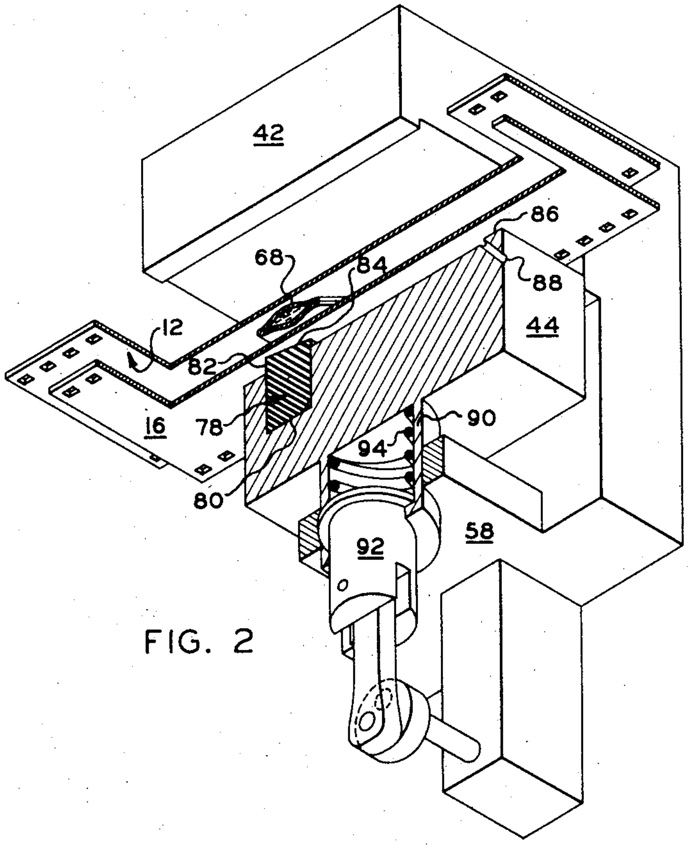
Fig. 2 is a perspective view, partially in section and with parts broken away, showing in detail elements of the apparatus of Fig. 1.
Figure 3:
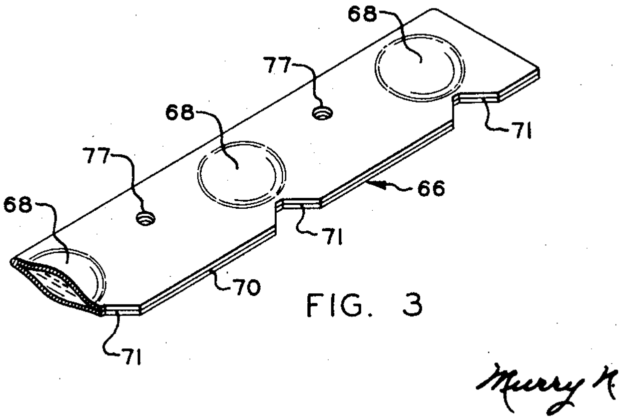
Fig. 3 is a perspective view, partially in section, of container means for supplying processing liquid.

Referring now to Fig. 2, there is shown in detail means for applying a compressive pressure to a container to discharge its liquid contents between a frame and an area of the photosensitive and second strips. This means comprises a resilient member adapted to engage and compress the container as the platens are moved together. In the form shown, this means comprises a rubber member 78 retainer in a recess 80 in the movable platen 44. The rubber member 78 includes an end portion 82 extending beyond surface 48 of platen 44 and having a surface 84 adapted to apply pressure to container 68. Surface 84 of end portion 82 is at an angle with respect to pressure-applying surfaces 46 and 48 of the platens so that discharge of the liquid contents is directed toward the center of a frame and area. While the means for compressing the container is illustrated as a rubber member having a pressure-applying surface adapted to engage a container, it is to be understood that other suitable pressure-applying means may be considered as being within the scope of the invention and may comprise, for example, a plate adapted to engage the container and retained in a suitable recess in platen 44 and urged toward the container by suitable spring means housed in the same recess. By virtue of the foregoing arrangement, the container is compressed and the liquid contents thereof are discharged between the strips as the platens are moved toward one another but before compressive pressure is applied to the strips to spread the liquid in a thin layer therebetween.

In order to spread processing liquid between a frame and an area, platens 42 and 44 are moved together to compress the strips between presure-applying surfaces 46 and 48 and means are provided for insuring a spread of the processing liquid in a uniform layer of predetermined thickness at least coextensive with a frame. This means may comprise a raised shoulder along at least one of the edges of either of the platens and, in the form shown in Fig. 2, a shoulder 86 is provided at the end of pressure-applying surface 48 away from a container 68. The height of shoulder 86 may be equal to the predetermined thickness of the layer of processing liquid to be spread between the strips. Shoulders may also be provided along the sides of pressure-applying surface 48, and serve not only to space the pressure-applying surfaces 46 and 48 a predetermined distance apart but to retain the processing liquid between the strips. In this form of the invention, platen 44 may be provided with a hole 86 extending from pressure-applying surface 48 to the exterior of said platen 44 to permit the escape of air trapped between pressure-applying surface 48 and the strip adjacent said surface. As another means for assuring the spreading of a layer of processing liquid of predetermined thickness between the strips, there may be provided resilient means for applying a constant or uniform compressive pressure to the strips. As shown in Fig. 2, this means may comprise a cylindrical shaft 90 on which platen 44 is mounted. Crank 64 is pivotally connected to a pistonlike member 92 slidably retained within shaft 90 and adapted to bear against a spring 94 within said shaft. By virtue of spring 94, the pressure exerted by platen 44 when reciprocated toward platen 42 is a constant which depends on the resiliency of spring 94. The thickness of the layer of processing liquid being a function of the pressure exerted on the strips, the viscosity of the processing liquid may be accurately controlled in this manner. In this form of the invention, it may be desirable, in order to insure a layer of liquid at least coextensive with a frame, to provide the liquid in a quantity in excess of that required to form a layer of the predetermined thickness. When excess liquid is provided between the strips, means may be required to trap the excess liquid squeezed from between the strips. This trap means may, for example, comprise portions of either of the strips adapted to absorbedly retain the processing liquid or means associated with either of the platens.

In accordance with the present invention, mechanical and electrical means are provided for driving the apparatus and controlling the operation of the various elements thereof. The drive means includes some suitable source of power and may comprise, preferably as shown, an electric motor 96. Motor 96 runs continuously in a counterclockwise direction (as viewed in Fig. 1) and is connected through suitable flexible connectors such as, for example, belts, ropes or chains 98 and 100 to, respectively, pulleys 102 and 104 so that said pulleys rotate in a clockwise direction. Pulley 102 is connected through means such as a shaft 106 to one plate of a single revolution clutch 108. The other plate of clutch 108 is connected through a suitable shaft 110 to a gear 112 and Geneva movement 28. Gear 112 is in engagement with, or connected through a pair of suitable idler gears 114 to, gear 116 which in turn is connected through shaft 118 to pulley 120, sprocket 22 and pulley 122 so that gear 116, shaft 118, sprocket 22 and pulleys 120 and 122, mounted on said shaft 118, rotate in a clockwise direction (viewing Fig. 1). Pulley 120 is connected through means such as a belt 124 to pulley 126 mounted on shaft 128 with sprocket 120. By virtue of the foregoing arrangement of gears, shafts, pulleys and connecting belts, one revolution of clutch 108 results in the rotation of sprockets 20 and 22 in a clockwise direction sufficient to advance photosensitive strip 12 and second strip 16 a distance equal to the length of one frame into loops of said strips extending, respectively, between sprockets 20 and 24, and 22 and 26.

As a means for intermittently and rapidly advancing a frame and an area of the photosensitive and second strips, respectively, into superposition between the pressure-applying surfaces of the platens, Geneva movement 28 is connected through a shaft 130 to sprocket 26 and pulley 132, the latter in turn being connected through a belt 134, pulley 136 and shaft 138 to sprocket 24. Thus, one revolution of clutch 108 transmitted through Geneva movement 28 results in the rapid clockwise rotation of sprockets 24 and 26 sufficient to advance, respectively, photosensitive strip 12 and second strip 16, in engagement with said sprockets, a distance at least equal to the length of one frame and one area.

In order to rotate sprockets 30 and 32 at the same speed and time as sprockets 24 and 26, a pulley 139 mounted on shaft 130 is operatively connected by a belt 140 to pulley 141 on shaft 142. Shaft 142 is connected so as to rotate in a clockwise direction and is secured to sprocket 32, thereby rotating the latter when sprocket 66 mounted on shaft 130 is rotated. Pulley 144, mounted on shaft 142, is connected through means such as a cross belt 146 to pulley 148 mounted on shaft 150 with sprocket 30, whereby sprocket 30 is rotated counterclockwise, thus advancing photosensitive sheet 12 when shaft 142 is rotated in a clockwise direction. Sprockets 38 and 40 rotate, respectively, at the same speed and time as sprockets 20 and 22 by virtue of their operative connection with shaft 118. Pulley 122, mounted on shaft 118, is connected through a belt 152 with pulley 154 mounted on shaft 156 to which are secured sprocket 40 and pulley 158. Pulley 158 is connected through a cross belt 160 with pulley 162 on shaft 164 on which is mounted sprocket 38.

As a means for advancing a container or pod into position between the superposed photosensitive and second strips simultaneously with the advancement of a frame and an area thereof into superposition between the platens, sprocket 76 in engagement with container strip 66 is operatively connected with Geneva movement 28 by means such as a pair of bevel gears 166 and 168. Bevel gear 166 is mounted on shaft 130 and bevel gear 168 is mounted in engagement with gear 166 on shaft 170 on which sprocket 76 is also mounted.

Means are provided for reciprocating platen 44 toward and away from platen 42 and, in the form shown, comprises a conventional crank 64 mounted on shaft 172. A spur gear 174, mounted on shaft 172, engages another spur gear 176 mounted on shaft 178 which in turn is secured to one plate of a single revolution clutch 180. The other plate of single revolution clutch 180 is attached to shaft 182 on which is mounted pulley 104, the latter being driven through belt 100 by motor 96.

Electrical-mechanical means are provided for controlling the operations of the various elements of the apparatus and for timing their sequence of operations relative to one another. Power for the control means including the control circuit may be supplied from any suitable direct current source connected with leads 184 and 186. To start a processing cycle of the apparatus, there is provided a switch 188 for connecting solenoid 190 in circuit with leads 184 and 186. An electrical pulse, sufficient to energize solenoid 190, serves to actuate single revolution clutch 180 controlled by said solenoid and connects shaft 106 with shaft 110. Rotation of shaft 110 through one revolution results in advancement of a frame of photosensitive strip 12 into superposition with an area of second strip 16 between platens 42 and 44 and the advancement of a container 68 carrying the processing liquid into position between the two strips.

In order to move platen 44 toward platen 42 when a frame and an area of the strips and a container have been positioned therebetween, there is provided a second circuit for energizing a second solenoid 192 adapted to actuate single revolution clutch 180, and mechanical means for completing the circuit at a predetermined time relative to the movement of the strips. In the form shown, the circuit for solenoid 192 includes lead 184 connected with the solenoid, a second lead 194 from the solenoid to one side of a switch 196 and lead 186 from the other side of switch 196. Switch 196 is normally open and is closed at the proper instant to complete the circuit to the solenoid 192 by a cam 198 mounted on shaft 110 and adapted to close switch 196 for a short interval at the end of its one revolution cycle. Energizing solenoid 196 results in the engagement of single revolution clutch 180, causing the rotation for one revolution of shaft 178 and gear 176 mounted thereon. The ratio of teeth on gears 174 and 176 is two to one whereby one revolution of gear 176 results in one half a revolution of gear 174 and shaft 172 on which it is mounted. One half of a revolution of shaft 176 in turn results in rotation of crank 64 so as to move platen 44 toward platen 42.

As platen 44 is moved toward platen 42, the liquid contents of a container 68 positioned between the strips is discharged between a frame and an area thereof and then is spread between said frame and area by the pressure exerted by pressure-applying surfaces 46 and 48 of the platens. Processing of the strips is permitted to continue for a predetermined time during which the platens are held against one another in operative juxtaposition and, at the end of this predetermined time, platen 44 is moved away from platen 42 and the strips are separated. As a means for decreasing the length of processing during which the platens are operatively juxtaposed, platens 42 and 44 may be provided with suitable heating means (not shown) for raising their temperature and thereby accelerate the processing rate of the strips positioned therebetween. To effect the reciprocation of platen 44 away from platen 42 at the end of a predetermined processing time, there is provided an interval timer 198 for closing a switch 200 to energize solenoid 192. Solenoid 192 is connected in a series circuit comprising lead 184, solenoid 192, lead 194, switch 200 and lead 186. Switch 200 is normally open and may be closed to energize solenoid 192 and actuate single revolution clutch 180, thereby rotating gear 174, shaft 172 and crank 64 through one half a revolution to move platen 44 away from platen 42. Because of the tension on strip 16 as it is advanced between sprockets 26 and 32, said strip is held in contact with platen 44 and as said platen is moved away from platen 42 and strip 12 held in contact therewith, strip 16 is separated from strip 12.

Interval timer 198 may comprise a conventional holding circuit together with a timing circuit adapted to close switch 200 at the end of a predetermined interval. To actuate the holding and timing circuits at the start of a processing period, there is provided a switch 202 connected by leads 204 with interval timer 198. Switch 202 is normally open and is closed at the start of the processing interval by a member 206 secured to gear 174 and adapted to engage and close switch 122 at the end of the one half revolution cycle of said gear 174 during which platen 44 is moved toward platen 42.

At the end of a processing cycle, switch 188 may be closed again, thereby starting another processing cycle of the apparatus. Switch 188 may be manually operated or associated with interval timer 198, or other means, for automatically closing said switch at the end of a processing cycle and thereby making the operation of the apparatus automatically repetitive.

Since certain changes may be made in the above apparatus and process without departing from the scope of the invention herein involved, it is intended that all matter contained in the above description or shown in the accompanying drawings shall be interpreted as illustrative and not in a limiting sense.

What is claimed is:

1. A photographic processing apparatus comprising, in combination, a pair of platens having pressure-applying surfaces, at least one of said platens being provided with shoulders along the edges of its pressure-applying surface, means for advancing successive frames of a photosensitive strip into superposition with successive areas of a second strip between said pressure-applying surfaces, means for providing a quantity of processing liquid between a frame and an area, and means for moving one of said platens toward the other of said platens to apply compressive pressure on said strips to effect the spreading of said processing liquid in a layer at least coextensive with said frame, said shoulders being so formed as to space said pressure-applying surfaces a predetermined distance apart and to prevent the escape of processing liquid from between said strips.

2. A photographic processing apparatus comprising, in combination, a pair of platens having substantially flat unyielding pressure-applying surfaces, means for advancing successive frames of a photosensitive strip into superposition with successive areas of a second strip between said pressure-applying surfaces, means for providing a quantity of processing liquid between a frame and an area in a mass occupying an area substantially smaller than said frame, means for moving one of said platens toward the other of said platens to apply compressive pressure on said strips substantially simultaneously over said entire frame to effect the spreading of said processing liquid from said mass in a layer over an area at least coextensive with said frame, and control means rendering said strip-advancing means inoperative when said platen-moving means is rendered operative.

3. A photographic processing apparatus comprising, in combination, a pair of platens having pressure-applying surfaces, means for advancing successive frames of a photosensitive strip into superposition with successive areas of a second strip between said pressure-applying surfaces, means for providing a quantity of processing liquid between a frame and an area, means for moving one of said platens toward the other of said platens to apply compressive pressure on said strips to effect the spreading of said processing liquid in a layer at least coexetnsive with said frame, and control means rendering said platen-moving means operative to maintain said platens in pressure-applying position during a predetermined processing time and, at the end of said time, rendering the last-mentioned means operative to move said one of said platens away from the other of said platens.

4. A photographic apparatus as defined in claim 3 including tension means for maintaining said strips in contact with said platens whereby said strips are separated from one another when said platens are moved apart.

5. A photographic processing apparatus comprising, in combination, a pair of platens having pressure-applying surfaces, means for advancing successive frames of a photosensitive strip into superposition with successive areas of a second strip between said pressure-applying surfaces, means for positioning a rupturable container, having therein a quantity of said processing liquid, between said strips, punch means for predeterminedly weakening said rupturable container for controlling the discharge of said liquid from said container when the latter is subjected to compressive pressure, means associated with one of said platens for applying compressive pressure to said container to effect the discharge of said liquid between said frame and said area, and means for moving one of said platens toward the other of said platens to apply compressive pressure on said strips to effect the spreading of said processing liquid in a layer at least coextensive with said frame.

6. A photographic processing apparatus comprising, in combination, a pair of platens, each of said platens having a pressure-applying surface, said platens being adapted to receive between said pressure-applying surfaces a photosensitive strip and a second strip, drive means intermittently operative to advance said strips between said platens in order to position successive frames of said photosensitive strip between said pressure-applying surfaces in superposition with successive areas of said second strip, means for supplying a frame positioned between said platens with a quantity of processing liquid, reciprocal means operative, when said drive means is inoperative, to juxtapose said platens and exert compressive pressure between said frame and an area of said strips to effect the spreading of said liquid in a layer at least coextensive with said frame, and control means for simultaneously rendering said drive means inoperative and said reciprocal means operative to move one of said platens toward the other of said platens, maintaining said platens in juxtaposition during the predetermined processing time and, at the end of said time, rendering said reciprocal means operative to move said one platen away from said other platen.

7. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, at least one of said platens being provided with shoulders along the edges of the pressure-applying surface thereof, means operative to advance successive frames of said photosensitive strip into superposition with successive areas of a second strip between said platens, means for supplying a frame positioned between said platens with a quantity of processing liquid, and reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame, said shoulders being so formed as to prevent the escape of said processing liquid from between said strips and to space said platens a predetermined distance apart whereby said processing liquid may be spread between said strips in a layer of predetermined thickness.

8. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means operative to advance successive frames of said photosensitive strip into superposition with successive areas of a second strip between said platens, means for supplying a frame positioned between said platens with a quantity of processing liquid, and reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame, said reciprocal means including resilient means for maintaining at a predetermined constant the pressure exerted between said pressure-applying surfaces for spreading said liquid in a layer of predetermined thickness between said strips.

9. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means operative to advance successive frames of said photosensitive strip into superposition with successive areas of a second strip between aid platens, said strip-advancing means being so positioned and arranged as to advance one of said strips between said platens in contact with the pressure-applying surface of said fixed platen and to advance the other of said strips between said platens in contact with the pressure-applying surface of said movable platen, reciprocal means for moving said movable platen toward and away from said fixed platen, and means for maintaining a constant predetermined tension on said other strip whereby it is retained in contact with said movable platen and is separated from said one strip when said movable platen is moved away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame.

10. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, said strip-advancing means including first sprocket means for advancing said photosensitive and second strips from their respective supplies at constant speed into take-up loops, second sprocket means for intermittently advancing said strips at rapid speed from said take-up loops into superposition with said platens, third sprocket means operating simultaneously with said second sprocket means for intermittently advancing said strips at rapid speed from between said platens into take-up loops, and fourth sprocket means operating simultaneously with said first sprocket means for advancing said strips at constant speed from said take-up loops to their respective take-up means, means for supplying a frame positioned between said platens with a quantity of processing liquid, and reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame.

11. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, means for supplying a frame positioned between said platens with a quantity of processing liquid, reciprocal means for moving said movable platen toward and away from said fixed platen, control means including means for rendering said strip-advancing means inoperative, means for rendering said reciprocal means operative to move said movable platen toward said fixed platen and maintain said platens in operative juxtaposition for a predetermined processing time, and means for rendering said reciprocal means operative at the end of said predetermined processing time to move said movable platen away from said fixed platen, said platens being adapted, when operatively juxtaposed, to exert compressive pressure on a frame and an area positioned between said pressure-applying surfaces and thereby effect the spreading of said processing liquid in a layer at least coextensive with said frame.

12. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, means for supplying a frame positioned between said platens with a quantity of processing liquid, reciprocal means for moving said movable platen toward and away from said fixed platen, and means associated with said platens for heating the same and thereby decreasing the predetermined time required for processing said strips, said platens being adapted, when operatively juxtaposed, to exert compressive pressure on a frame and an area of said strips positioned between said pressure-applying surfaces and thereby effect the spreading of said processing liquid in a layer at least coextensive with said frame.

13. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, means for positioning a rupturable container having therein a quantity of said processing liquid between said strips, punch means for predeterminedly weakening said rupturable container for controlling the discharge of said liquid from said container when the latter is subjected to compressive pressure, means associated with one of said platens for applying compressive pressure to said container to effect the discharge of said liquid between said frame and said area, and reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame.

14. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, means for supplying a frame positioned between said platens with a quantity of processing liquid, reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame, control means including means for rendering said strip-advancing means operative, means associated with said strip-advancing means for actuating said control means when a frame and an area of said strips have been advanced into superposition between said platens, means responsive to said control means for rendering operative said reciprocal means and moving said movable platen into operative juxtaposition with said fixed platen, timing control means, and means associated with said reciprocal means for actuating said timing control means, the latter being adapted, at the end of a predetermined interval during which said platens are retained in juxtaposition, to render said reciprocal means operative to move said movable platen out of juxtaposition with said fixed platen.

15. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, means for supplying a frame positioned between said platens with a quantity of processing liquid, reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame, continuously running drive means, first clutch means for operatively connecting said drive means with said strip-advancing means, second clutch means for operatively connecting said drive means with said reciprocal means, and control means including means adapted to effect the engagement of said first clutch means to advance a frame and an area of said strips into superposition with said platens, means for effecting the engagement of said second clutch means rendering said reciprocal means operative to move said movable platen toward said fixed platen thereby operatively juxtaposing said platens and timing means whereby said platens are retained in juxtaposition during a predetermined processing time at the end of which said second clutch means is engaged rendering said reciprocal means operative to move said platens out of juxtaposition.

16. A photographic processing apparatus comprising, in combination, a fixed platen, a platen movable with respect to said fixed platen, each of said platens having a pressure-applying surface, said platens being adapted to receive between said pressure-applying surfaces a photosensitive strip and a second strip, means for advancing successive frames of said photosensitive strip into superposition with successive areas of a second strip between said platens, means for supplying a frame positioned between said platens with a quantity of processing liquid, reciprocal means for moving said movable platen toward and away from said fixed platen, said platens being adapted, when operatively juxtaposed, to exert compressive pressure on a frame and an area of said strips positioned between said pressure-applying surfaces and thereby effect the spreading of said processing liquid in a layer at least coextensive with said frame, continuously running drive means, first clutch means for operatively connecting said drive means with said strip-advancing means, second clutch means for operatively connecting said drive means with said reciprocal means, and control means including a first circuit and means for completing said circuit to energize means for engaging said first clutch means to advance said strips, a second circuit and means associated with said strip-advancing means for completing said circuit to energize means for engaging said second clutch means to connect said drive means with said reciprocal means whereby said platens are juxtaposed when a frame and an area of said strips are superposed between said platens, a third circuit and means associated with said reciprocal means for completing said circuit to timing means, and a fourth circuit, said timing means being capable of completing said fourth circuit to render said means operative to engage said second clutch means for connecting said drive means with said reciprocal means whereby said platens are moved out of juxtaposition, said timing means being adapted to complete said fourth circuit at a predetermined time after the completion of said third circuit, during which time said platens are retained in juxtaposition.

17. A photographic processing apparatus comprising, in combination, means for superposing successive exposure frames, each having substantial length and width dimensions, of a photosensitive strip with successive areas of a second strip, means for providing a quantity of processing fluid between a frame and an area of said strips in a mass on one of said strips substantially smaller in area than said frame, and reciprocating means movable substantially perpendicularly with respect to said strips and including means providing two substantially unyielding surfaces disposed in substantially parallel relation for applying compressive pressure to each superposed frame and area of said strips and spreading said processing fluid, from said mass in which it is supplied, between and in contact with said strips in a layer at least coextensive with said frame.

18. A photographic processing apparatus comprising, in combination, a pair of platens having substantially flat, unyielding pressure-applying surfaces disposed in substantially parallel relation, means for advancing successive exposure frames, each having substantial length and width dimensions, of a photosensitive strip into superposition with successive areas of a second strip between said pressure-applying surfaces, means for providing a quantity of processing liquid between each frame and area of said strips in contact with one of said strips in a mass substantially smaller in area than said frame, and means for moving one of said platens toward the other of said platens with said pressure-applying surfaces in substantially parallel relation for applying compressive pressure on each frame and area of said strips to effect the spreading of said processing liquid, from said mass in which it is supplied, in a layer in contact with said strips over an area at least coextensive with said each frame.

19. A photographic processing apparatus comprising, in combination, a pair of platens, said platens having substantially flat, unyielding pressure-applying surfaces disposed in substantially parallel relation and being adapted to receive between said pressure-applying surfaces a photosensitive strip and a second strip, driving means intermittently operative to advance and position successive exposure frames, each having substantial length and width dimensions, of said photosensitive strip between said pressure-applying surfaces in superposition with successive areas of said second strip, means for supplying each frame positioned between said platens with a quantity of processing fluid in a mass, on one of said strips, having an area substantially smaller than the area of said each frame, reciprocal means, operative when said drive means is inoperative, for juxtaposing said platens with said pressure-applying surfaces in substantially parallel relation for exerting compressive pressure on said each frame and area of said strips to effect the spreading of said fluid from said mass in a layer in contact with said strips over an area thereof at least coextensive with said each frame.

20. A photographic processing apparatus comprising, in combination, a fixed platen, a platen movable with respect to said fixed platen, said platens having substantially flat, unyielding pressure-applying surfaces and being adapted to receive between said pressure-applying surfaces a photosensitive strip and a second strip, means for advancing successive exposure frames, each having substantial length and width dimensions, of said photosensitive strip into superposition with successive areas of said second strip between said platens, means for supplying a quantity of processing fluid in a pool on one of said strips covering an area substantially smaller than the area of said frame, reciprocal means for moving said movable platen toward and away from said fixed platen, said platens being movable in substantially parallel relation into juxtaposition for exerting compressive pressure on each of the frames and areas of said strips positioned between said pressure-applying surfaces and thereby effecting the spreading of said processing fluid from said pool in a layer in contact with said strips over an area thereof at least coextensive with said each frame.

21. A photographic processing apparatus comprising, in combination, a pair of platens having substantially flat, unyielding pressure-applying surfaces mounted for movement toward and away from one another with said surfaces in substantially parallel relation, means for advancing successive exposure frames, each having substantial length and width dimensions, of a photosensitive strip into superposition with successive areas of a second strip between said pressure-applying surfaces, means for positioning a rupturable container, having therein a quantity of processing liquid, between said strips, means mounted on one of said platens for coacting in opposition with means comprising the other of said platens for compressing and rupturing said container and causing the discharge of said liquid between said frame and area in a pool on one of said strips substantially smaller in area than said frame, and means for moving one of said platens toward the other of said platens with said platens in substantially parallel relation for applying compressive pressure on an area of said strips at least coextensive with said frames to effect the spreading of said processing liquid from said pool in a layer in contact with said strips covering an area at least coextensive with said frame.

22. A photographic processing apparatus comprising, in combination, a fixed platen, a platen movable with respect to said fixed platen, each of said platens having an unyielding pressure-applying surface, said platens being positioned to receive between said pressure-applying surfaces a photosensitive strip and a second strip, means for advancing successive exposure frames, each having substantial length and width dimensions, of said photosensitive strip into superposition with successive areas of a second strip between said platens, means for positioning a rupturable container having therein a quantity of said processing liquid between said strips, means associated with one of said platens for compressing and rupturing said container and causing the discharge of the liquid contents of said container between said frame and area in contact with one of said strips in a pool occupying an area substantially smaller than said frame, and reciprocal means for moving said movable platen toward and away from said fixed platen, said platens being mounted for movement into juxtaposition with said pressure-applying surfaces in substantially parallel relation so as to exert compressive pressure on a frame and area of said strips positioned between said pressure-applying surfaces and thereby effect the spreading of said processing liquid, from said pool, in a layer in contact with said strips over an area at least coextensive with said frame.

23. The method of treating successive exposure frames, each having substantial length and width dimensions, of a strip of photosensitive material with a liquid processing reagent, said method comprising intermittently advancing each successive frame into superposition with an area of a second strip, locating said superposed frame and area between a pair of pressure-applying surfaces of a pair of rigid members while the advancement of said strips between said pressure-applying surfaces is continued, providing a quantity of processing liquid between said frame and area, in contact with one of said strips in a mass occupying an area substantially smaller than said frame, simultaneously applying compressive pressure to said strips throughout an area substantially coextensive with said frame to distribute said processing liquid from said mass in a layer between and in contact with said strips over an area at least coextensive with said frame, maintaining the compressive pressure on said strips during a predetermined processing period, at the end of said period relieving said compressive pressure, advancing said frame and area from between said pressure-applying surfaces, separating said frame and area of said strips, and advancing the next successive frame of said photosensitive strip into superposition with an area of said second strip between said pressure-applying surfaces.

24. A photographic apparatus as defined in claim 18 wherein said means for moving said one of said platens toward said other of said platens includes resilient means coupled to said one platen for maintaining substantially constant the pressure exerted between said pressure-applying surfaces whereby said processing liquid is spread in a layer of predetermined thickness between said strips.

References Cited in the file of this patent

UNITED STATES PATENTS

| | | |
|---|---|---|
| 2,572,357 | Land | Oct. 23, 1951 |
| 2,647,056 | Land | July 28, 1953 |
| 2,669,168 | Land | Feb. 16, 1954 |
| 2,686,717 | Land | Aug. 17, 1954 |
| 2,687,478 | Land | Aug. 24, 1954 |
| 2,788,269 | Bartlett | Jan. 22, 1957 |

FOREIGN PATENTS

| | | |
|---|---|---|
| 470,197 | Great Britain | Aug. 11, 1937 |